United States Patent [19]

Tenmoku et al.

[11] Patent Number: 4,999,783

[45] Date of Patent: Mar. 12, 1991

[54] LOCATION DETECTING METHOD

[75] Inventors: Kenji Tenmoku; Osamu Shimizu; Toshiyuki Shimizu; Kunihiko Mito, all of Osaka, Japan

[73] Assignee: Sumitomo Electric Industries, Ltd., Osaka, Japan

[21] Appl. No.: 295,206

[22] PCT Filed: May 10, 1988

[86] PCT No.: PCT/JP88/00452

§ 371 Date: Dec. 22, 1988

§ 102(e) Date: Dec. 22, 1988

[87] PCT Pub. No.: WO88/08961

PCT Pub. Date: Nov. 17, 1988

[30] Foreign Application Priority Data

May 11, 1987 [JP] Japan .................. 62-113985

[51] Int. Cl.⁵ .............................. G06F 15/50
[52] U.S. Cl. .................. 364/450; 364/449; 364/447; 364/460; 73/178 R
[58] Field of Search ............. 364/424.01, 424.02, 364/449, 450, 459, 460, 447; 340/995, 988; 73/178 R

[56] References Cited

U.S. PATENT DOCUMENTS

| | | | |
|---|---|---|---|
| 4,679,147 | 7/1987 | Tsujii et al. | 340/995 |
| 4,782,447 | 11/1988 | Ueno et al. | 340/995 |
| 4,796,191 | 11/1989 | Honey et al. | 364/449 |
| 4,807,127 | 2/1989 | Tenmoku et al. | 364/424.01 |

FOREIGN PATENT DOCUMENTS 0082316 4/1987 Japan .................. 340/995

Primary Examiner—Parshotam S. Lall
Assistant Examiner—Michael Zanelli
Attorney, Agent, or Firm—Lane, Aitken & McCann

[57] ABSTRACT

A location detecting method for detecting the location of a vehicle within a predetermined area, comprising the steps of: outputting distance data at every predetermined interval, the distance data being representative of the distance that a vehicle has travelled; outputting heading angle data at every predetermined interval, the heading angle data being representative of the heading angle change of vehicle travel; storing road map data representative of roads; computing a present location data from the distance data and the heading angle data; computing a first limit error (E1) and a second limit error (E2) of the present location data which are determined on the basis of errors in the distance data, in the heading angle data and in the road map data; registering locations on the roads, which roads are located within the first limit error (E1) of the present location data, as estimate locations; computing correlation coefficients respectively corresponding to the registered estimate locations; selecting a correlation coefficient whose error is smallest with respect to the road from the computed correlation coefficients; and outputting the registered estimate location corresponding to the selected correlation coefficient as a present location.

16 Claims, 5 Drawing Sheets

LOCATION DETECTING METHOD

TECHNICAL FIELD

The present invention relates in general to a location detecting method, and in particular, to such a method which detects the location of a vehicle being travelling on an arbitrary place of road traffic network without receiving data from the outside via radio waves and the like.

BACKGROUND ART

As a conventional location detecting system which detects the location of a vehicle being travelling on an arbitrary place of road traffic network, there has been proposed a system which uses the principle of dead reckoning and comprises a distance sensor, a heading or direction sensor and a processing unit for giving necessary processes to output signals from the distance and heading sensors. In the dead reckoning, a data regarding the present location of a vehicle is obtained by integrating the amount of change in distance and heading. However, there is the drawback that the distance and heading errors that are inevitably inherent in the distance and heading sensors are accumulated with vehicle travel, and the errors in the present location data obtained by the distance and heading sensors are also accumulated.

In order to overcome the drawback described above, map matching methods have been proposed in U.S. Pat. No. 3,789,198, Japanese patent laid-open publication No. 58-99715, Japanese patent laid-open publication No. 58-113711, "LANDFALL A HIGH-RESOLUTION AUTOMATIC VEHICLE-LOCATION SYSTEM", D. KING, GEC Journal of Science & Technology, Vol. 45, No. 1, 1987, and "Experimental Study to Automotive Travel Electronic Technology", Society of Automotive Travel Electronic Technology, March, 1982. In the map matching methods, the present location data obtained in accordance with the aforementioned dead reckoning is compared with a previously stored road traffic network data, the departed amount of the present location data from the road data is computed as an accumulated error, and the present location data is corrected by the accumulated error and matched with the road data.

More specifically, (1) in the location detecting method described in the U.S. Pat. No. 3,789,198, the present location data of a vehicle is calculated upon the travel distance data obtained by a distance sensor and the travel heading data obtained by a heading sensor. The calculated present location data is compared with a previously stored road location data. If the difference between the present location data and the road location data is within a predetermined threshold value, the present location data is corrected so as to correspond with the nearest road, and on the other hand, if the difference between the both data exceeds the predetermined threshold value, no correction is made, in order that the correction can be made with high precision and the present location data can be displayed accurately.

(2) In the location detecting method described in the Japanese patent laid-open publication No. 58-99715, to display an accurate present location, the present location data of a vehicle is updated at every predetermined distance by calculating the amount of distance change with respect to the coordinate directions of road map, and when the present location data is departed from the road, the location data corresponding to the nearest road is merely determined as a present location data.

(3) In the vehicle location detecting method described in the Japanese patent laid-open publication No. 58-113711, to display an accurate present location, errors arising from a travel heading sensor for detecting a heading or direction of vehicle travel with respect to the earth's magnetic axis are corrected by comparing the radius of curvature obtained upon the travel heading with the radius of the road.

(4) In the vehicle location detecting method described in the "LANDFALL A HIGH-RESOLUTION AUTOMATIC VEHICLE-LOCATION SYSTEM", road traffic network is grouped into non-branch parts and a plurality of typical branch parts, and when the vehicle is travelling from any one of the branch parts to other branch part, the distance between the two branch parts is calculated upon the signal from a distance sensor, and when it was determined that the vehicle reached the branch part, the branch exit to which the vehicle was directed is determined by detecting the travel heading change thereafter by a heading sensor, in order to accurately display the location of a vehicle as a location on the road.

(5) In the location detecting method described in the "Experimental Study to Automotive Travel Electronic Technology", in the case a vehicle is travelling on a road other than an intersection, the location of the vehicle is detected as a location on the road, and in the case a vehicle travels an intersection, by detecting a greater change in heading, the location of the vehicle is corrected to the intersection. However, in the case a vehicle travels an intersection wherein a plurality of roads are branched, the location of the vehicle is not corrected and detected by a travel heading data and a travel distance data (dead reckoning), and thereafter no correction is made until branched roads are determined as a unitary road.

The location detecting methods described above can display accurately the present location of a vehicle by correcting an increase in accumulated errors, in the case road traffic network is relatively simple. However, when trucks and the like approach and in the areas where buildings, railway crossings and the like are present, a heading sensor is subjected to errors because of the influence of the external magnetic field, and as a result the accumulated errors resulting from the heading sensor which causes greater errors as compared with a distance sensor are to be included in the present location data of a vehicle as an error which cannot be corrected. If, therefore, the present location data is merely corrected by corresponding with the nearest road, there will be the possibility of displaying a road entirely different from an actual road as a present location. On the contrary, if, as in the case of the aforementioned method (5), the present location is detected only by dead reckoning without correcting until a unitary road is determined, there is the problem that a unitary road cannot be determined eternally, and ultimately distance errors are accumulated.

On the other hand, in a distance sensor for detecting a distance that a vehicle travels, the accumulated errors caused by the distance sensor occasionally exceed an allowable limit value as the distance sensor is subjected to the influence of air pressure and like of the tire. Therefore, the same problem as the above case is also involved in the distance sensor.

And, even if the occurrence probability of the problems described above is in a low condition, there is the problem that, once accumulated errors exceed an allowable limit value, the vehicle location data detected thereafter becomes entirely inaccurate as it is detected on the basis of an inaccurate present location data, and therefore the location detecting systems of the type described above are not suitable for practical use.

In order to eliminate the aforementioned problems, the inventors of this application have proposed a location detecting method wherein an estimate location is obtained by an integrated data obtained by integrating the change in travel distance and travel heading at every predetermined interval, an error amount of the estimate location is obtained by the integrated data and an error of road map, the estimate location is registered as a self-location by corresponding with all roads located within a range of the error amount centering on the estimate location, a correlation coefficient corresponding to each road of the registered estimate locations is computed, a correlation coefficient showing the minimum error with respect to the road is selected, and an estimate location corresponding to the selected correlation coefficient is outputted as a present location.

In this location detecting method, all of the roads located within a range of the error amount corresponding to the estimate location are retrieved, the correlation coefficient between the road and the estimate location is computed, and the location of the road corresponding to the correlation coefficient having the minimum error can be outputted as a present location, thereby increasing an accuracy in the detection of position.

However, a subject road cannot be detected, in the case that a road map is in error, that a vehicle travels a large or complicated intersection, that a road map is partly omitted, that a vehicle travels a road which is not shown in a road map, for temporary reasons such as construction, traffic regulation and the like, or that a travel distance or travel heading sensor is damaged and therefore the sensor error became large. Even if a subject road can be detected, the correlation between the estimate location and road map cannot be detected as the degree of correlation becomes very small, or a road that does not coincide with an actual route of a vehicle is detected as a present location. As a result, the present location is detected only by dead reckoning, and therefore the total location error continues to increase because of sensor errors, and ultimately the present location must be manually corrected to correspond with the actual route of a vehicle by an operator.

Accordingly, it is an object of the present invention to provide an improved location detecting method which is capable of detecting an accurate present location of a vehicle without being subjected to the influence of the complexity of roads, errors in road map, a part omission in road map, sensor errors and the like.

SUMMARY OF THE INVENTION

In order to achieve the aforementioned object, the location detecting method according to the present invention comprises the steps of: outputting distance data at every predetermined interval, the distance data being representative of the distance that a vehicle has travelled; outputting heading angle data at every predetermined interval, the heading angle data being representative of the heading angle change of vehicle travel; storing road map data representative of roads; computing a present location data from the distance data and the heading angle data; computing a first limit error (E1) and a second limit error (E2) of the present location data which are determined on the basis of errors in the distance data, in the heading angle data and in the road map data; registering locations on the roads, which roads are located within the first limit error (E1) of the present location data, as estimate locations; computing correlation coefficients respectively corresponding to the registered estimate locations; selecting a correlation coefficient whose error is smallest with respect to the road from the computed correlation coefficients; outputting the registered estimate location corresponding to the selected correlation coefficient as a present location; and if the roads, which are located within the first limit error (E1) of the present location data, do not exist, outputting the present location data computed from the distance data and the heading angle data as a present location, registering locations on the roads, which roads are located within the second limit error (E2) of the present location data, as estimate locations, and when a correlation coefficient, whose error is less than a predetermined value and smallest with respect to each road of the registered estimate locations, is obtained, outputting the estimate location corresponding to the correlation coefficient as a present location.

The correlation coefficient whose error is smallest with respect to the road may be selected by selecting the correlation coefficient which is largest among the computed correlation coefficients and the estimate location corresponding to the correlation coefficient which is largest among the computed correlation coefficients may be outputted as a present location In this case, when the computed correlation coefficient is less than a predetermined value, registration of the corresponding estimate location may be erased. Also, when the difference between the computed correlation coefficients is more than a predetermined value, registration of the estimate location corresponding to the smaller correlation coefficient may be erased. Further, in these cases, the registration of the corresponding estimate location may be erased after the vehicle passed a predetermined place of the road.

The correlation coefficient which is largest may be selected by providing a predetermined hysteresis characteristic, in the case that the estimate location corresponding to the largest correlation coefficient and the estimate location corresponding to the second largest correlation coefficient are inverted. Also, in the case that there are a plurality of estimation locations corresponding to the correlation coefficient which is largest, the estimate location which is nearest to a center of the road may be outputted as a present location.

The distance data representative of the distance that a vehicle has travelled may be outputted at every predetermined time and the heading angle data representative of the heading angle change of vehicle travel may be outputted at every predetermined time. Also, the distance data representative of the distance that a vehicle has travelled may be outputted at every predetermined distance and the heading angle data representative of the heading angle change of vehicle travel may be outputted at every predetermined distance.

The correlation coefficients corresponding to all the roads which are located within the second limit error may be evaluated. In this case, in the second limit error, the roads may be classified and the correlation coefficients corresponding to the classified roads may be evaluated. In the case that the second limit error consists of a plurality of limit errors which are different in size, while the vehicle travels a predetermined distance, correlation coefficients corresponding to subject roads may be evaluated in order of narrower limit error until an estimate location corresponding to a correlation coefficient whose error is less than a predetermined value and smallest. As the size of the second limit error increases, correlation coefficients corresponding to arterial roads may be evaluated. Considering characteristic of vehicle travel, correlation coefficients corresponding to roads that the vehicle may travel with high probability may be evaluated as the size of the second limit error increases.

The correlation coefficient may be computed by accumulating a function having as a parameter the error between the estimate location to the registered road and a location on the road map at a particular point. In this case, the estimate location may be corrected by the amount of the error between the estimate location to each road and a location on the road map at a last particular point. Also, in the case that a road of a correlation coefficient to be selected within the first limit error is only one and that the correlation coefficient is maintained larger than a predetermined value while the vehicle travels a predetermined place of the road, the estimate location may be corrected by the amount of the error between the estimate location to the corresponding road and a location on the road map at the latest particular point.

BEST MODE FOR CARRYING OUT THE INVENTION

Figure 1:
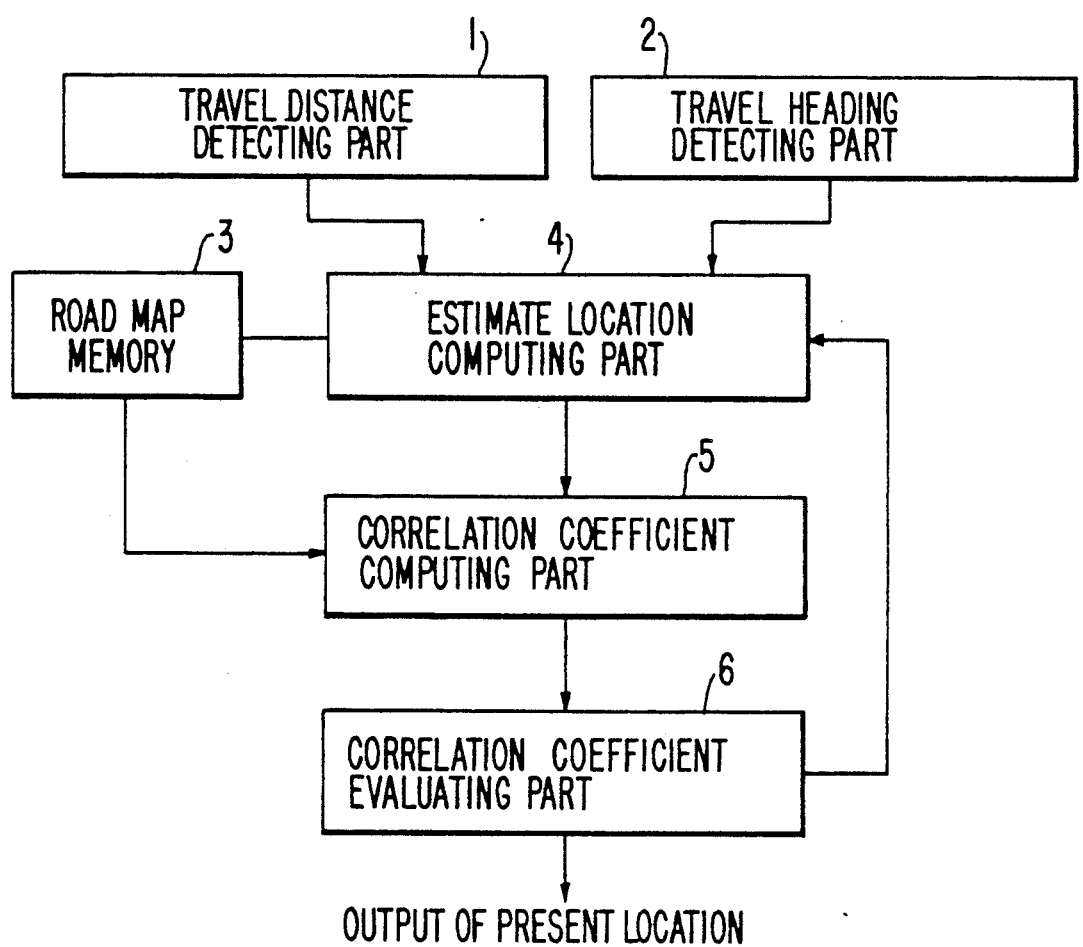
FIG. 1 is a block diagram showing one embodiment of an apparatus for carrying out a location detecting method according to the present invention.

Referring to FIG. 1, an embodiment of an apparatus for carrying out a location detecting method according to the present invention is shown which comprises a travel distance detecting part 1, a travel heading or direction detecting part 2, a road map memory 3 in which road traffic network of a predetermined area is stored in advance, an estimate location computing part 4 for computing an estimate location upon a distance-detection signal outputted from the travel distance detecting part 1, a heading-detection signal outputted from the travel heading detecting part 2, a map data outputted from the road map memory 3 and upon an evaluation data outputted from a correlation coefficient evaluating part which is to be described hereinafter, a correlation coefficient computing part 5 for computing a correlation coefficient upon the map data outputted from the road map memory 3 and a location data outputted from the estimate location computing part 4, and a correlation coefficient evaluating part 6 for evaluating the magnitude of the correlation coefficient computed by the correlation coefficient computing part 5 and for outputting the present location of a vehicle.

More specifically, the aforementioned travel distance detecting part 1 is constructed so as to calculate the distance that a vehicle has travelled per unit time, and may comprise, for example, a photoelectric switch for detecting revolutions of a vehicle wheel, a counter for counting the number of pulse signals outputted from the photoelectric switch to obtain the number of revolutions of a vehicle wheel, and a multiplier for multiplying the count data outputted from the counter by a predetermined constant representative of the circumference of a vehicle wheel. It is noted that the travel distance detecting part 1 may also comprise a known construction wherein the distance that a vehicle has travelled is computed by computing the speed at which a vehicle travels by the use of a Doppler shift and integrating the vehicle speed.

The aforementioned travel heading detecting part 2 may comprise a magnetic sensor which is adapted to output a heading angle data per unit time by detecting the horizontal component force of the earth's magnetism, or may comprise other direction-sensitive elements. For example, a gyro and the like can be used as a travel heading detecting part.

The aforementioned road map memory 3 has stored therein road map data of a predetermined area consisting of combination data of dots and lines representative of the heading of a road, the distance between branch parts and the like, and may comprise a semiconductor memory, a cassette tape, a CD-ROM or the like.

The aforementioned estimate location computing part 4 is adapted to compute a present location data (Px Py) by computing an east-west direction component dx ($=dL \times \cos(d\theta)$) and a south-north direction component dy ($=dL \times \sin(d\theta)$) of the distance dL that a vehicle has travelled, on the basis of the distance data dL outputted from the travel distance detecting part 1 and the heading angle data $d\theta$ outputted from the travel heading detecting part 2, and by adding the components dx and dy to a last-known location data (Px', Py'). The estimate location computing part 4 also computes a first limit error E1 that the present location data (Px, Py) may have, by adding an increase in a limit error corresponding to the aforesaid distance data dL to a limit error (including distance errors, heading angle errors and road map errors) that the last-known location data (Px', Py') may have. Also, the estimate location computing part 4 computes a second limit error E2 which is larger than the aforesaid first limit error E1. It is noted that the second limit error E2 may also be a constant error which is larger than a predictable first limit error E1, or an error corresponding to the change in the first limit error E1, or the maximum error of a predictable location. In the case a correlation coefficient larger than a predetermined threshold value was detected in the correlation coefficient evaluating part 6, the aforesaid first limit error E1 is used. On the contrary, in the case a correlation coefficient larger than a predetermined threshold value was not detected in the correlation coefficient evaluating part 6, the aforesaid second limit error E2 is used. Furthermore, the estimate location computing part 4 detects curves (including branches) upon the aforesaid distance data dL and heading angle data dθ, registers locations on the roads, which roads are located within a range of the limit error centering on the aforesaid location data (Px, Py), as estimate locations in an appropriate memory (not shown), and displays all of the estimate locations on an appropriate display unit (not shown).

The aforementioned correlation coefficient computing part 5 is adapted to compute the similarity between the movement of the estimate locations on all of the roads registered in the estimate location computing part 4 and the roads stored in the road map memory 3. That is, the correlation coefficient computing part 5 computes the error between the estimate location corresponding to each road and the location on the road of the road map memory 3 at a particular point (hereinafter referred to as a "location on map"), and computes correlation coefficients by accumulating functions each having this error as a parameter.

More specifically, the aforesaid particular point is intended to mean a computation timing of the correlation coefficient which is set at every predetermined distance or every predetermined time. The correlation coefficient varies with the movement of a vehicle, and a sum function is used for computing the aforesaid correlation coefficient. If a last-known correlation coefficient is defined in terms of ri, j and the correlation coefficient calculated this time is defined in terms of drj, a new correlation coefficient ri+1,j can be calculated as follows:

$$ri+1,j = A \times ri,j + B \times drj$$

(wherein drj indicates a value adding (−) to an absolute value of the error between the estimate location to the road and the location on map, j indicates a coefficient showing a registered estimate location, A and B indicate coefficients, respectively, and therefore if the initial value of the correlation coefficient is 0, the correlation coefficient becomes a minus value at all times and also if A=B=0.5, the new correlation coefficient becomes a simple average). That is, the correlation coefficient of the estimate location whose error is smallest with respect to a road, becomes largest It is also possible that the correlation coefficient of the estimate location whose error is smallest with respect to a road, is made smallest by changing a computation method of the correlation coefficient. As a function for computing a correlation coefficient, an exponential smoothing and the like can be used.

The aforementioned correlation coefficient evaluating part 6 is adapted to discriminate whether a correlation coefficient larger than a predetermined threshold value exists among the correlation coefficients respectively corresponding to aforesaid estimate locations, evaluate the magnitude of the correlation coefficients corresponding to the estimate locations which are larger than the predetermined threshold value, output the estimate location corresponding to the largest correlation coefficient as an actual present location, and erase the registration of the remaining estimate locations. More specifically, the correlation coefficient evaluating part 6 discriminates whether there exists a correlation coefficient larger than a predetermined threshold value and evaluates the magnitude of the correlation coefficients at every particular point, and erases the registration of the estimate location corresponding to the correlation coefficient which became smaller than the predetermined threshold value. As to the correlation coefficients corresponding to the estimate locations which were not erased, they are updated in succession to new correlation coefficients in the correlation coefficient computing part 5, and the aforementioned evaluation is repeated again. Ultimately only one estimate location remains by repeating the evaluating operation, and is to be continuously displayed as a present location.

The location detecting operation of the apparatus constructed as described above will hereinafter be described in detail, making reference to FIGS. 2 through 5.

Figure 2:
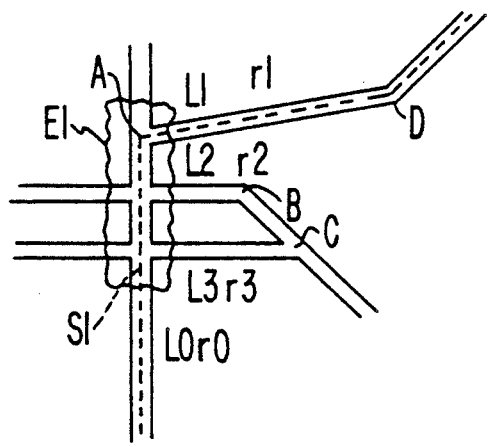
FIG. 2 is a schematic view showing a part of road traffic network and an actual route that a vehicle travels.

FIG. 2 is a schematic view showing a part of road traffic network, and only roads L0, L1, L2 and L3 are shown. It is assumed that a vehicle travels from the road L0 to the road L1 as indicated by dot lines S1. The aforesaid first limit error is designated by E1, branches by A and C, curves by B and D, and the correlation coefficients corresponding to the estimate locations on the roads L0, L1, L2 and L3 by r0, r1, r2 and r3, respectively.

Figure 3:
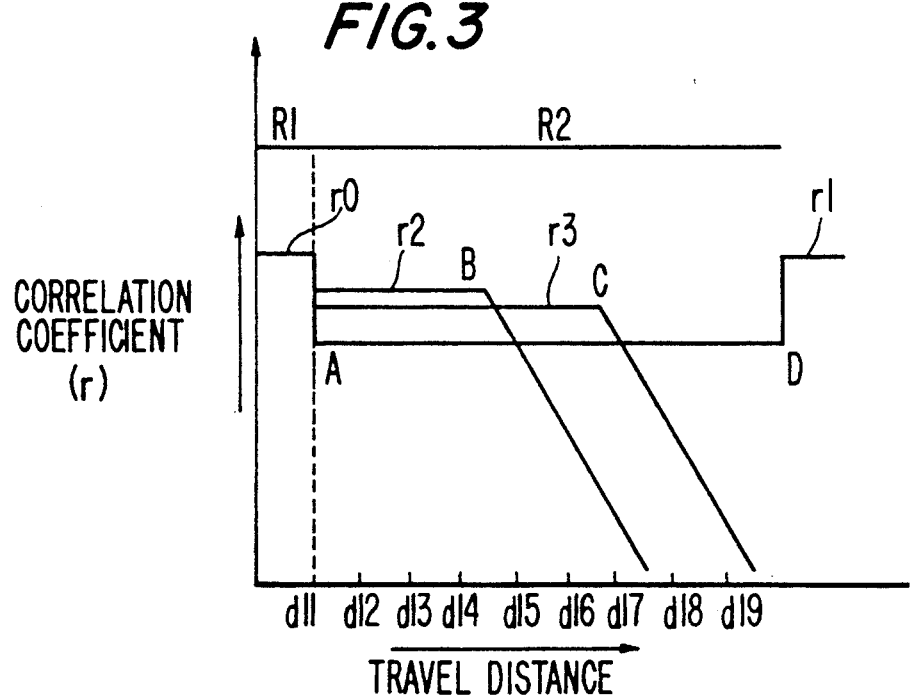
FIG. 3 is a diagram showing the change of correlation coefficients when a vehicle travels along the dot lines indicated in FIG. 2.

FIG. 3 illustrates the change of the correlation coefficient r when the vehicle travelled along the dot lines S1 shown in FIG. 2, and each of d11, d12, ... d1n indicates a correlation coefficient updating time.

When the vehicle is travelling along the road L0, only the correlation coefficient r0 is large and other correlation coefficients r1, r2 and r3 are small (see the region R1 in FIG. 3) until it is discriminated that the vehicle entered the road L1 through the branch A (until the heading angle change data becomes more than a predetermined threshold value). That is, since the heading angle change data is small until the vehicle passes the branch A, there is no influence of the roads L1, L2 and L3 and only the distance that the vehicle has travelled along the road L1 comes into question. For this reason, the location data computed by the estimate location computing part 4 can be corrected so as to correspond with the location data on the road L0. On the basis of the corrected location data, the present location of the vehicle can be confirmed by displaying the road map and the corrected location on the road L0 on the display unit (not shown).

In the case the vehicle entered the road L1 through the branch A, the correlation coefficients r1, r2 and r3 corresponding to the roads L1, L2 and L3 which are located within the first limit error E1 are computed by the correlation coefficient computing part 5 (see the region R2 in FIG. 3), and the computed correlation coefficients are evaluated by the correlation coefficient evaluating part 6. That is, regarding the roads located within the first limit error E1, the corresponding correlation coefficients are larger than the predetermined threshold value, and therefore the magnitude of the correlation coefficients is evaluated and it is evaluated whether the change of the estimate location is similar to a road. More specifically, since the travel heading angle change data is more than a predetermined value, the correlation coefficient r0 corresponding to the road L0 can be ignored, and on the contrary, the correlation coefficients r1, r2 and r3 corresponding to the roads L1, L2 and L3 located with the first limit error E1 must be evaluated. Although, as shown in FIG. 3, the correlation coefficients r2 and r3 are larger than the correlation coefficient r1 in the vicinity of the branch A, this results from the errors in the travel heading detecting part 2. That is, this is because the output of the travel heading detecting part 2 showed a value which is closer to the headings of roads L2 and L3 (but, in general, the correlation coefficient r1 corresponding to the estimate location on the road L1 becomes largest). Also, for the reason that the correlation coefficient r2 is larger than the correlation coefficient r3 is that the estimate location is closer to the road L2 than the road L3. However, the correlation coefficient r2 of the estimate location on the road L2 becomes rapidly smaller after the estimate location on the road L2 passed the curve B because the heading detected by the travel heading detecting part 2 is greatly departed from the heading of the road L2. Also, the correlation coefficient r3 of the estimate location on the road L3 becomes rapidly smaller after the estimate location on the road L3 passed the branch C because the heading detected by the travel heading detecting part 2 is greatly departed from the heading of the road L3. On the other hand, since the correlation coefficient r1 of the estimate location on the road L1 little changes, it becomes correspondingly larger, so that the estimate location on the road L1 can be discriminated as a present location. The present location can be displayed, together with the road map, on the display unit (not shown) That is, until the estimate location on the road L1 reaches the branch A, the present location can be displayed in correspondence with the location on the road L0, and until the estimate location on the road L2 passes the curve B after the estimate location on the road L1 passed the branch A, the present location can be displayed in correspondence with the location on the road L2, and until the estimate location on the road L3 passes the branch C after the estimate location on the road L2 passed the curve B, the present location can be displayed in correspondence with the location on the road L3, and after the estimate location on the road L3 passed the branch C, the present location can be displayed in correspondence with the location on the road L1. It is noted that, in FIG. 3, the correlation coefficient r1 has been set to a maximum value (for example, 0), in the case the estimate location on the road L1 was discriminated as a present location.

Thereafter, by repeating the aforementioned processes on the basis of the location on the road L1, an accurate present location can be displayed in succession with vehicle travel.

It is noted that the accurate present location may be discriminated at a predetermined place of a road, for example, at the curve D in FIG. 3. Also, at the time a correlation coefficient has been less than a predetermined value (not shown), the estimate location of the corresponding correlation coefficient may be erased. Furthermore, at the time the difference between correlation coefficients has been more than a predetermined value, the registration of the estimate location corresponding to the smaller correlation coefficient may be erased.

In the aforementioned embodiment shown in FIGS. 2 and 3, the largest correlation coefficient is changed from r2 to r3 and to r1, and the display on the display unit (not shown) is also transferred from the road L2 to the road L3 and to the road L1. However, in the case the order of correlation coefficients is inverted, the display on the display unit (not shown) can be prevented from being transferred to the different roads rapidly and more frequently by providing a hysteresis characteristic.

Figure 4:
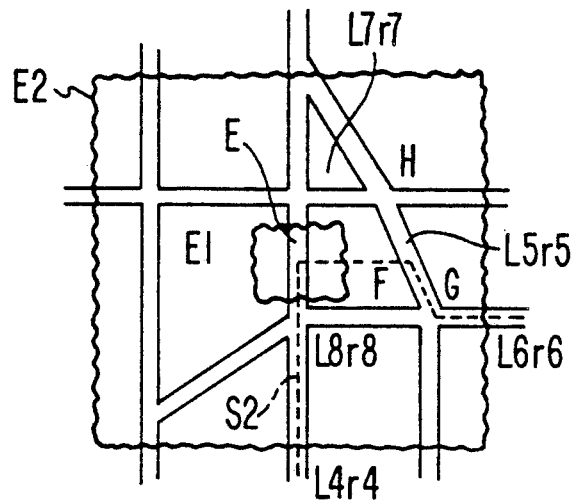
FIG. 4 is a schematic view showing a part of road traffic network and an actual route that a vehicle travels.

FIG. 4 shows a part of another road traffic network, and it is assumed that a vehicle travels from a road L4 to roads L5 and L6 through a road which is not shown in the road map, as indicated by broken lines S2. A first limit error and a second limit error are designated by E1 and E2, and branches (including not only branches shown in the road map but branches not shown in the road map) by E, F, G and H, respectively. The correlation coefficients corresponding to the estimate locations on the roads L4, L5, L6, L7 and L8 are designated by r4, r5, r6, r7 and r8, respectively.

Figure 5:
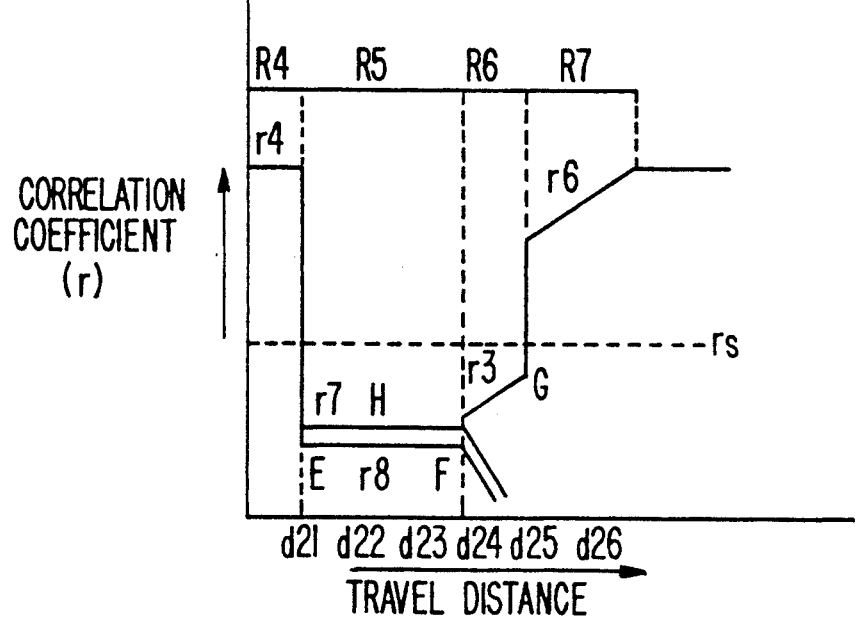
FIG. 5 is a diagram showing the change of correlation coefficients when a vehicle travels along the dot lines indicated in FIG. 4.

FIG. 5 illustrates the change of the correlation coefficient r in the case the vehicle travelled along the broken lines S2 shown in FIG. 4, and each of d21, d22, ... d2n indicates a correlation coefficient updating time.

When the vehicle is travelling along the road L4, only the correlation coefficient r4 is large and other correlation coefficients r5, r6 and r7 are small (see the region R4 in FIG. 5) until it is discriminated that the vehicle passed the branch E and the travel heading thereof was greatly changed (until the heading angle change data exceeds a predetermined threshold value). That is, since the heading angle change data is small until the vehicle passes the branch E, there is no influence of other roads and only the distance that the vehicle has travelled along the road L4 comes into question. For this reason, the location data computed by the estimate location computing part 4 can be corrected so as to correspond with the location data on the road L4. On the basis of the corrected location data, the present location of the vehicle can be confirmed by displaying the road map and the corrected location on the road L4 on the display unit (not shown).

In the case the vehicle passed the branch E and was departed form the road L4, no registered roads are located within the first limit error E1. Thereafter, the vehicle continues to travel in the condition that no registered roads are located within the first limit error E1, that is, in the condition that the correlation coefficients of all of the roads are less than a predetermined threshold value. Accordingly, until a registered road whose correlation coefficient is large is obtained, the location of the vehicle is detected on the basis of the output signals from the travel distance detecting part 1 and the travel heading detecting part 2 (dead reckoning). The estimate location obtained by the dead reckoning is displayed on the display unit (not shown) until a registered road whose correlation coefficient is large is obtained.

And, at this point, correlation coefficients are computed on the basis of registered roads which are located within the second limit error E2 larger than the first limit error E1, and the estimate location which has been obtained by the read reckoning (see the region R5 in FIG. 5).

While the vehicle is travelling from the branch E toward the branch F, the roads L7 and L8 are located near the vehicle and also the headings of the roads L7 and L8 are relatively similar to the travel heading of the vehicle. However, the dead reckoning is continued because the correlation coefficients r7 and r8 corresponding to the roads L7 and L8 are still less than a threshold value for discriminating a pertinent road.

If the vehicle turns to the right at the branch F, the correlation coefficients r7 and r8 corresponding to the registered roads L7 and L8 are rapidly reduced because the headings of the roads L7 and L8 are greatly different from the travel headings of the vehicle. On the other hand, the correlation coefficient r5 corresponding to the road L5 is rapidly increased because the road r5 is located very near to the vehicle and furthermore the heading of the road L5 is very similar to the travel heading of the vehicle (see the region R6 in FIG. 5).

Thereafter, if the vehicle turns to the left at the branch G, the road pattern from the registered road L5 to the registered road L6 becomes very similar to the route that the vehicle travels, and furthermore the travel distance and travel heading to the registered road L6 become very similar to the travel distance and heading of the vehicle. As a result, the correlation coefficient r6 is more rapidly increased and becomes larger than a predetermined threshold value rs (see the region R7 in FIG. 5). Accordingly, the road L6 can be determined as a road along which the vehicle is now travelling.

At this point, the registration of other roads is erased and the location on the registered road L6 is displayed as a present location, since there are no roads whose correlation coefficients are larger than the correlation coefficient r6.

In the aforementioned embodiment shown FIGS. 4 and 5, there were not a plurality of registered roads whose correlation coefficients are large (there were not a plurality of registered roads whose correlation coefficients are larger than a predetermined threshold value rs or there were not a plurality of registered roads each having a difference larger than a predetermined value). In the case there are a plurality of registered roads whose correlation coefficients are large, the correlation coefficients varying with the vehicle travel thereafter are evaluated. When a predetermined condition (for example, a condition that a correlation coefficient is larger than a predetermined threshold value rs and also larger than the remaining correlation coefficients by a predetermined value) is met, the estimate location on the corresponding road is determined as a present location. Of course, the registration of other estimate locations is erased at this point.

However, in the case the aforementioned predetermined condition was not met, the location detection is continued with the condition that there are a plurality of the corresponding roads, and only the largest correlation coefficient is outputted as a present location. Even this case, the aforementioned predetermined condition is to be met after the vehicle travelled a predetermined travel distance. Accordingly, when the condition is met, the registration of other estimate locations is erased and only the corresponding location is registered as a present location.

Also, the aforementioned embodiment is a case that an error is little involved in the estimate location. But, even if errors were involved in the estimation of the present location and the vehicle were determined to be located at the branch H when it is located at the branch E, an accurate road could be registered and an accurate present location could be detected by the same method described above. In other words, if the pattern of vehicle travel coincides with the road map, even if an error is involved in an initial location, an accurate present location can be finally detected as long as the error is within the maximum value of the limit error.

In the case relatively smaller roads are registered in the road map or a vehicle travels only roads registered in the road map, at least one road exists within the relatively narrow first limit error E1. Therefore, by registering estimate locations which have relatively larger correlation coefficients among the roads located within the first limit error E1, the vehicle travel is continued grasping as present locations the estimate locations having a relatively higher probability. And, since one of the correlation coefficients of the estimate locations will become remarkably higher as compared with other correlation coefficients, the present location can be detected accurately by erasing the registration of other estimate locations when one of the correlation coefficients becomes remarkably higher.

On the other hand, in the case a vehicle is travelling parts not registered in the road map (narrows roads, vacant land and the like) or in the case a large error is originally involved in the estimate location, there is no guarantee that at least one road is located with the relatively narrow first limit error E1 and it is impossible to register an estimate location as a location on a registered road. Therefore, in this case, the vehicle travel and display is done by the dead reckoning based upon vehicle distance and vehicle heading, and at the same time the second limit error E2 larger than the first limit error E1 is used. The correlation coefficients corresponding to the roads located within the second limit error E2 are computed, and the dead reckoning is continued registering the computed correlation coefficients. That is, since a present location is estimated only by the travel distance and travel heading although the similarity to the road map is considered to a certain degree, it is possible to estimate a present location in the condition that a relatively wider range of road map is considered. On the basis of the change of the correlation coefficient, a present location can be accurately detected as follow.

And, in the case a correlation coefficient met a predetermined condition (i.e., a correlation coefficient was larger than a predetermined threshold value and larger than other correlation coefficients by a predetermined value), the location on the road corresponding to the correlation coefficient is adopted as a present location, and thereafter a present location can be estimated, considering the similarity to a road.

In the aforementioned embodiment shown in FIGS. 4 and 5, as to computation of a correlation coefficient when the second limit error E2 is used, it is not always necessary to compute momentarily because the present location is estimated by the dead reckoning. The present location corresponding to the estimate location detected by the dead reckoning may be detected from among registered roads within a certain degree of time.

Furthermore, in the case the error in an estimate location was more than the second limit error E2 for some reasons, an accurate road cannot be detected. Therefore, in the case the second limit error E2 is used and an accurate road cannot be detected even if the vehicle travels a predetermined distance, a third limit error larger than the second limit error E2 or a limit error larger than the third limit error is used. However, in this case, since the number of registered roads is increased as a limit error become larger, by classifying the level of roads and reducing a processing time at every classified road, it is preferable that an accurate present location be detected within a predetermined time.

That is, the reduction of a memory amount and the shortening of a processing time may be achieved by limiting registered roads only to main arterial roads or to roads that a subject vehicle may travel with high probability, in consideration of the characteristic of vehicle travel. In this case, it is possible to compute only the correlation coefficients corresponding to the main arterial roads or roads having a high probability of vehicle travel, but it is rare that the vehicle continuously travels only narrow roads and has been departed from the registered road for a long time. Therefore, if the vehicle travels a certain distance, an accurate road is finally registered and an accurate present location can be detected.

The aforementioned embodiment is applied to a navigation system wherein the detected location on the road map is visually displayed, and if the error of an estimate location became larger for some reasons, the estimate location can be manually corrected to coincide with an accurate present location by an operator. In addition, since the estimate location can be corrected automatically, an operational performance can be greatly enhanced. Accordingly, in the case a detected location is not displayed visually in the interior of a vehicle like location system, the reliability of the whole system can be remarkably enhanced because errors can be automatically corrected if the vehicle travels a certain distance.

From the foregoing description, it will be seen that the present invention is applicable to a navigation system, wherein the present location and destination are displayed with the road map to direct a vehicle to the destination, by displaying the output of the present location in the interior of the vehicle. The present invention is also applicable to a location system, wherein the locations of a large number of vehicles are detected, by transmitting the output of the present location from the vehicle to the outside via radio waves and by receiving the radio waves at a central base station.

It is noted that this invention is not limited to the aforementioned embodiments. For example, in the case there are a plurality of estimate locations corresponding to the largest correlation coefficient, it is possible to output as a present location the estimate location which is nearest to the center of the road. It is also possible to integrate the change in travel distance and heading at every predetermined time instead of at every predetermined distance. Other modifications and alternations are also possible without departing from the scope of this invention.

Figure 6:
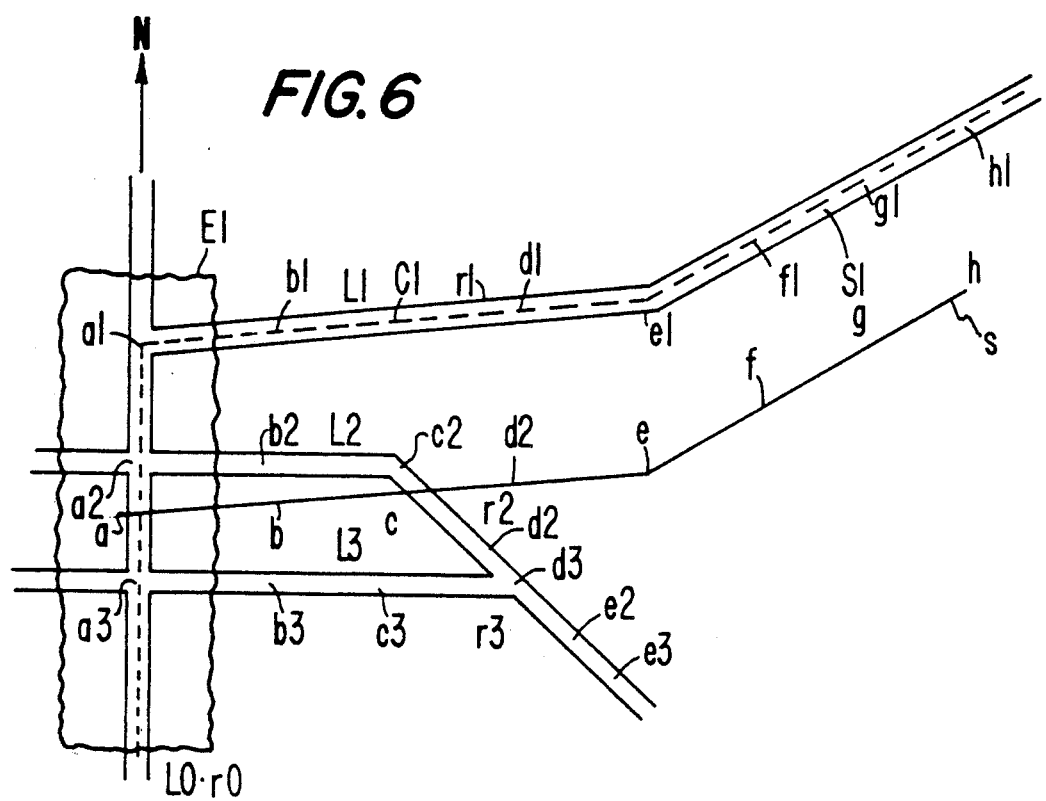
FIG. 6 is a schematic view showing an estimate location and an actual route that a vehicle travels to explain another embodiment of the present invention.
Figure 7:
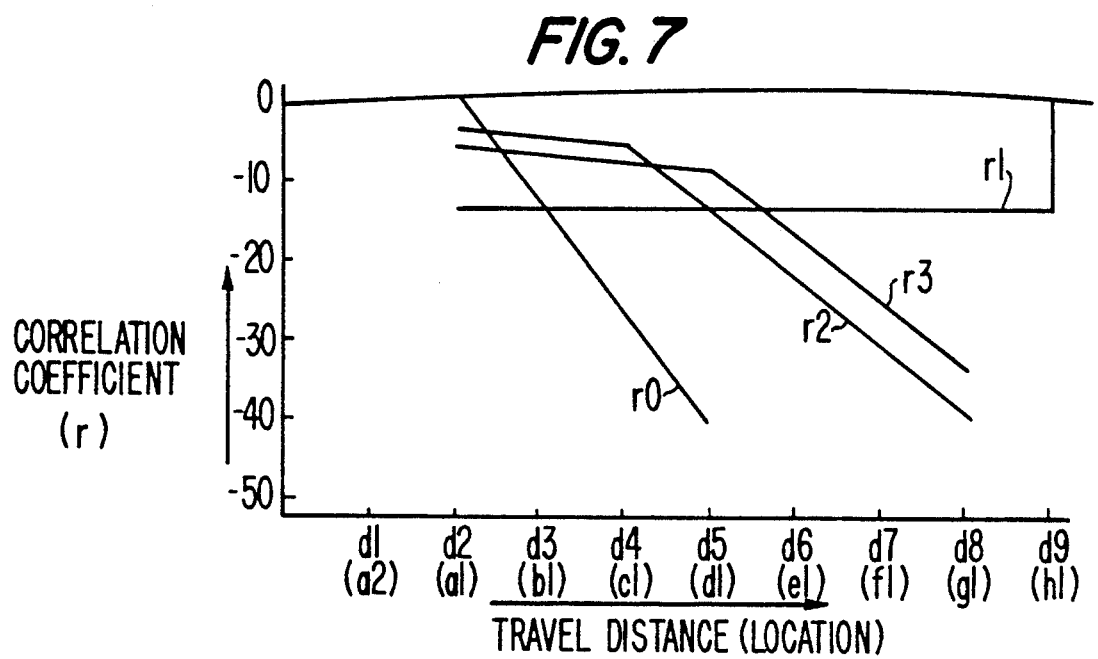
FIG. 7 is a diagram showing the change of correlation coefficients corresponding to FIG. 6.
Figure 8:
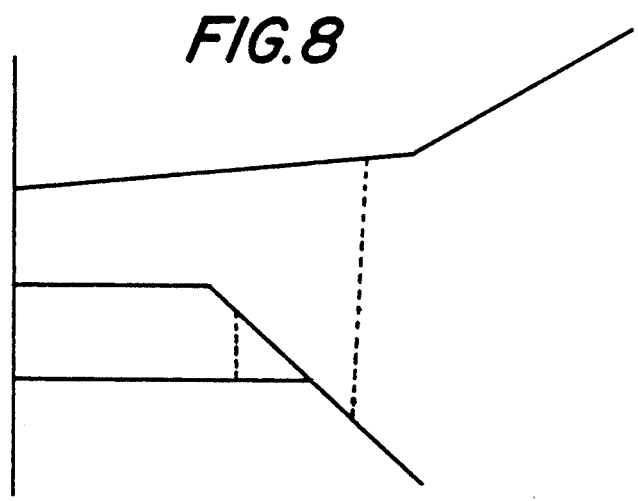
FIG. 8 illustrates a present location displayed on a road whose correlation coefficient is larger.

Referring to FIGS. 6 through 8, there is shown another embodiment of the location detection method according to the present invention. The table 1 shows the transition of correlation coefficients.

This embodiment is substantially identical to the aforementioned embodiment except that the correlation coefficient computing part 5 computes a correlation coefficient on the basis of the distance error between the estimate location corresponding to each road and the location on the road map at a particular point (hereinafter referred to as an "error at particular point").

More specifically, the correlation coefficient computing part 5 uses the following equation to compute a correlation coefficient:

$$ri+1.j = A \times ri.j + B \times drj$$

(wherein drj indicates a value adding (−) to an absolute value of the error at the particular point, j indicates a coefficient showing a registered estimate location. $A = B = 1$, the initial value and reset value of the correlation coefficient are 0). The correlation coefficient is computed at every predetermined distance (particular point), and in this embodiment the correlation coefficient is computed at every 10 m.

Like the aforementioned embodiment, the correlation coefficient evaluating part 6 is adapted to discriminate whether there exists a correlation coefficient larger than a predetermined threshold value among the correlation coefficients respectively corresponding to estimate locations of roads, evaluate the magnitude of the correlation coefficients corresponding to the estimate locations which are larger than a predetermined threshold value, output the estimate location corresponding to the largest correlation coefficient as an actual present location, and erase the registration of other estimate locations if a condition is met. More specifically, if the condition of less than a predetermined value continues two times from the value of the maximum correlation coefficient, the corresponding road is erased, and in the case a registered road continues more than 10 m in one condition, the estimate location corresponding to the registered road is reset and at the same time the correlation coefficient is also reset.

FIG. 6 is a schematic view showing a part of road traffic network, and as in the case of FIG. 2, only roads L0, L1, L2 and L3 are shown. It is assumed that a vehicle travels from the road L0 to the road L1 as indicated by broken lines S1. The solid line S indicates the change of the estimate location computed on the basis of data outputted from the travel distance computing part 1 and travel heading computing part 2, and an error of 14 m is involved in the distance data from the travel distance computing part 1. A first limit error is designated by E1. Reference characters a, b, c, d, e, f, g and h indicate estimate locations which are computed at every particular point on the basis of data outputted from the travel distance computing part 1 and travel heading computing part 2, respectively. Reference characters a1, b1, c1, d1, e1, f1, g1 and h1 indicate estimate locations to the road L1 at the particular points, respectively. Reference characters a2, b2, c2, d2, e2, f2, g2 and h2 indicate estimate locations to the road L2 at the particular points, respectively. Reference characters a3, b3, c3, d3, e3, f3, g3 and h3 indicate estimate locations to the road L3 at the particular points, respectively. Correlation coefficients corresponding to the estimate locations on the roads L0, L1, L2 and L3 are designated by r0, r1, r2 and r3, respectively.

The table 1 shows the error at the particular point and the transition of correlation coefficients r, in the case the vehicle travelled as indicated by the broken lines S1 in FIG. 6. It is noted that the aforementioned correlation coefficients are computed by the aforementioned equation for computing a correlation coefficient.

TABLE 1

| | Transition of Correlation Coefficient | | | | | | | | |
|---|---|---|---|---|---|---|---|---|---|
| | Just after spot a2 | Just after spot a1 | Just after spot b1 | Just after spot c1 | Just after spot d1 | Just after spot e1 | Just after spot f1 | Just after spot g1 | Just after spot h1 |
| Error between the estimate location and the location on road map to road L0 at | 0 m | 0 m | 13.51 m | 13.51 m | 13.51 m | | | | |

TABLE 1-continued

| | Transition of Correlation Coefficient | | | | | | | | |
|---|---|---|---|---|---|---|---|---|---|
| | Just after spot a2 | Just after spot a1 | Just after spot b1 | Just after spot c1 | Just after spot d1 | Just after spot e1 | Just after spot f1 | Just after spot g1 | Just after spot h1 |
| a particular point | | | | | | | | | |
| Estimate location to road L0 | 10 m below of spot a | spot a | 10 m above of spot a | 20 m above of spot a | 30 m above of spot a | | | | |
| Correlation coefficient r0 | 0 | 0 | −13.51 | −27.02 | −40.53 (erasion) | | | | |
| Error between the estimate location and the location on road map to road L1 at a particular point | | 14 m | 0 m | 0 m | 0 m | 0 m | 0 m | 0 m | 0 m |
| Estimate location to road L1 | | spot a1 | spot b1 | spot c1 | spot d1 | spot e1 | spot f1 | spot g1 | spot h1 |
| Correlation coefficient r1 | | −14 | −14 | −14 | −14 | −14 | −14 | −14 | 0 |
| Error between the estimate location and the location on road map to road L2 at a particular point | | 4 m | 0.87 m | 0.87 m | 8.45 m | 8.45 m | 8.45 m | 8.45 m | |
| Estimate location to road L2 | | spot a2 | spot b2 | spot c2 | spot d2 | spot e2 | 10 m right below of spot e2 | 20 m right below of spot e2 | |
| Correlation coefficient r2 | | −4 | −4.87 | −5.74 | −14.19 | −22.64 | −31.09 | −39.54 (erasion) | |
| Error between the estimate location and the location on road map to road L3 at a particular point | | 6 m | 0.87 m | 0.87 m | 0.87 m | 8.45 m | 8.45 m | 8.45 m | |
| Estimate location to road L3 | | spot a3 | spot b3 | spot c3 | spot d3 | spot e3 | 10 m right below of spot e3 | 20 m right below of spot e3 | |
| Correlation coefficient r3 | | −6 | −6.87 | −7.74 | −8.61 | −17.06 | −25.51 | −33.96 (erasion) | |
| Estimate location | 10 m below of spot a | spot a | spot b | spot c | spot d | spot e | spot f | spot g | Reset spot of spot h to spot h1 |

FIG. 7 illustrates the change of the correlation coefficient r when the vehicle travelled along the broken lines S1 shown in FIG. 6, and each of d11, d12, . . . d1n indicates a particular point.

When the vehicle is travelling along the road L0, only the correlation coefficient r0 is large and other correlation coefficients r1, r2 and r3 are small until it is discriminated that the vehicle entered the road L1 through a spot a. That is, since the error on the particular point d2 is small until the vehicle passes the spot a, there is no influence of the roads L1, L2 and L3 and only the distance that the vehicle has travelled along the road L1 comes into question. For this reason, the location data computed by the estimate location computing part 4 can be corrected so as to correspond with the location data on the road L0. On the basis of the corrected location data, the present location of the vehicle can be confirmed by displaying the road map and the corrected location on the road L0 on the display unit (not shown).

In the case the vehicle entered the road L1 through the spot a, the correlation coefficients r1, r2 and r3 corresponding to the roads L1, L2 and L3 which are located within the first limit error E1 are computed by the correlation coefficient computing part 5, and the computed correlation coefficients are evaluated by the correlation coefficient evaluating part 6. That is, regarding the roads located within the first limit error E1, the corresponding correlation coefficients are larger than the predetermined threshold value, and therefore the magnitude of the correlation coefficients is evaluated and it is evaluated whether the change of the estimate location is similar to a road. More specifically, since the error at the particular point d3 becomes larger, the correlation coefficient r0 to the road L0 becomes smaller, and on the contrary, the correlation coefficients r1, r2 and r3 to the roads L1, L2 and L3 located with the first limit error E1 become larger. Although, as shown in FIG. 7, the correlation coefficients r2 and r3 are larger at the particular point d3 than the correlation coefficient r1, this results from the error in the travel distance detecting part 1 (as mentioned above it is assumed that an error of 14 m is involved in the travel distance detecting part 1). That is, this is because the output of the travel distance detecting part 1 showed a value which is closer to the directions of roads L2 and L3 (but, in general, the correlation coefficient r1 corresponding to the estimate location on the road L1 becomes largest). Also, the reason that the correlation coefficient r2 is larger than the correlation coefficient r3 for the reason is for the reason that the estimate location is closer to the road L2 than the road L3. However, the correlation coefficient r2 of the estimate location on the road L2 becomes rapidly smaller after the vehicle passed the spot c1, because the heading detected by the travel heading detecting part 2 is greatly departed from the heading of the road L2 and the distance error at the particular point d5 becomes larger. Also, the correlation coefficient r3 of the estimate location on the road L3 becomes rapidly smaller after the vehicle passed the spot d1, because the heading detected by the travel heading detecting part 2 is greatly departed from the heading of the road L3 and the distance error at the particular point d6 becomes larger. On the other hand, since the correlation coefficient r1 of the estimate location on the road L1 little changes, it becomes correspondingly larger, so that the estimate location on the road L1 can be discriminated as a present location. The present location can be displayed, together with the road map, on the display unit (not shown). Finally, the estimate location (spot h) is reset to the spot h1 at the time the correlation coefficients of roads other than the road L1 become smaller and the registration thereof is erased (see the estimate location in the table 1).

FIG. 8 illustrates a present location displayed on a road wherein the correlation coefficient is large. That is, after the vehicle passed the spot a1, the present location has been displayed in correspondence with the location on the road L0 until the correlation coefficient r0 becomes smaller than the correlation coefficient r2. Until the correlation coefficient r2 becomes smaller than the correlation coefficient r3, the present location has been displayed in correspondence with the location on the road L2, and until the correlation coefficient r3 becomes smaller than the correlation coefficient r1, the present location has been displayed in correspondence with the location on the road L3. After the correlation coefficient r1 has become larger than the correlation coefficient r3, the present location has been displayed in correspondence with the location on the road L1.

Therefore, the display of the present location is departed from the actual road that the vehicle travels at the beginning that the vehicle passed the spot a1, but the present location can be displayed on the actual road that the vehicle travels, after the vehicle travels a predetermined distance.

As mentioned above with reference to FIGS. 4 and 5, when the vehicle is travelling the road not registered in the road map memory, the limit error is increased from the first limit error E1 to the second limit error E2, and the present location is detected only by the dead reckoning until the road registered in the road map memory is obtained.

Although in the aforementioned embodiment it is assumed that heading errors are not involved for simplifying the computation, the same method as described above can be applicable even if the heading errors are involved. In this case, a mistaken road tends to be detected as the correlation coefficient corresponding to to the actual road becomes smaller temporarily. However, after the vehicle travelled a predetermined distance, the road whose correlation coefficient is largest remains and the actual road can be outputted as a present location.

It is also noted that, if the location detecting method shown in FIGS. 2 and 3 is used at the same time, the right road can be detected more rapidly.

Further, the frequent change of the present location can be prevented and the present location can be detected more accurately, by selecting roads in consideration of the pattern of the past correlation coefficient r, dr and hysteresis, instead of displaying a present location on the road in which the largest correlation coefficient is obtained.

Further, in the case the registered road is only one and the estimate location is reset, a mistaken reset can be prevented by evaluating whether the correlation coefficients r and dr are right or not.

Also, it is possible to display a present location by the dead reckoning while the vehicle is taking curves, instead of displaying the present location at all times on a road. In this case, the frequent change of estimate location can be prevented while the vehicle is taking curves.

As mentioned above, in the present invention, estimate locations are registered with respect to all of roads which are located within a limit amount of the error inevitably inherent in the travel distance sensor and the error of road map, and correlation coefficients are computed regarding all of the aforesaid roads. On the basis of the estimate locations and correlation coefficients, the similarity of the road to the actual travel pattern is evaluated. In the case registered roads are not within the limit value of the aforesaid error, a limit value of wider error is used and the present location is detected by the dead reckoning, evaluating the similarity of the road to the actual travel pattern. Accordingly, even if the road pattern of the district that a vehicle travels is complicated, even if a plurality of roads exist in a congested condition, even if a vehicle travels a place other than registered roads, or even if the error of an estimate location becomes larger for some reasons, an estimate location having a relatively high probability can be outputted, and even if an inaccurate estimate location is outputted as a present location, an accurate present location can be outputted as a present location on the basis of the change of the correlation coefficient thereafter. As a result, the present invention can remarkably enhance the accuracy and reliability in the location detection without being subjected to the influence of the condition of vehicle travel.

INDUSTRIAL APPLICABILITY

The location detecting method according to the present invention is applicable to a navigation system, wherein the present location and destination are displayed with the road map to direct a vehicle to the destination, by displaying the output of the present location in the interior of the vehicle. The location detecting method is also applicable to a location system, wherein the locations of a large number of vehicles are detected, by transmitting the output of the present location from the vehicle to the outside via radio waves and by receiving the radio waves at a central base station.

We claim:

1. A location detecting method for detecting the location of a vehicle within a predetermined area, comprising the steps of:

outputting distance data at a predetermined interval, the distance data being representative of the distance that said vehicle has traveled;

outputting heading angle data at a predetermined interval, the heading angle data being representative of the heading angle change of the vehicle travel;

storing road map data representative of roads;

computing a present location data from said distance data and said heading angle data; computing a first limit error (E1) and a second limit error (E2) of said present location data which are determined on the basis of errors in said distance data, in said heading angle data and in said road map data;

registering locations of all roads located within said first limit error (E1), as estimate locations;

computing a correlation coefficient for each of said registered estimate locations to each of said roads located within said first limit error, by accumulating a function having as a parameter the errors between the estimate locations to the registered roads and a location on said road map at a particular point;

selecting one of said correlation coefficients indicating the error with respect to one of said roads is smallest of the errors indicated by said correlation coefficients;

outputting as a present location one of said estimate locations corresponding to the selected one correlation coefficient; and if any of said roads location within said first limit error (E1) do not exist, outputting as a present location said present location data computed from said distance data and said heading angle data and also registering locations on all said roads located within said second limit error (E2) as second estimate locations, and if a second one of said correlation coefficients indicating that error with respect to each said road of the registered second estimate locations is less than a predetermined value and is smallest of the errors indicated by said correlation coefficients, is obtained, then outputting as a present location one of said second estimate locations corresponding to said second correlation coefficient.

2. A location detecting method as set forth in claim 1, in which said selected one correlation coefficient is further selected by selecting one of said correlation coefficients which is largest among said computed correlation coefficients and in which one of said estimate locations corresponding to said correlation coefficient which is largest amount said computed correlation coefficients is outputted as a present location.

3. A location detecting method as set forth in claim 2, in which when one of said computed correlation coefficients is less than a predetermined value, registration of the corresponding estimate location is erased.

4. A location detecting method as set forth in claim 2, in which when a difference between two of said computed correlation coefficients is more than a predetermined value, registration of the estimate location corresponding to the smaller of the two correlation coefficients is erased.

5. A location detecting method as set forth in claim 3, or 4, in which said registration of the corresponding estimate location is erased after the vehicle passes a predetermined location on the road.

6. A location detecting method as set forth in claim 2, in which said correlation coefficient which is largest is selected by providing a predetermined hysteresis characteristic, in the case that the estimate location corresponding to the largest correlation coefficient and the estimate location corresponding to the second largest correlation coefficient are inverted.

7. A location detecting method as set forth in claim 2, in which, in the case that there are a plurality of estimation locations corresponding to said correlation coefficient which is largest, among said computed correlation coefficients the estimate location which is nearest to a center of the road is outputted as a present location.

8. A location detecting method as set forth in claim 2, in which said distance data representative of the distance that said vehicle has travelled is outputted at a predetermined time and in which said heading angle data representative of the heading angle change of vehicle travel is outputted at the predetermined time.

9. A location detecting method as set forth in claim 2, in which said distance data representative of the distance that said vehicle has travelled is outputted at a predetermined distance and in which said heading angle data representative of the heading angle change of vehicle travel is outputted at the predetermined distance.

10. A location detecting method as set forth in claim 2, in which said second correlation coefficient is obtained by evaluating correlation coefficients corresponding to all said roads which are located within said second limit error.

11. A location detecting method as set forth in claim 2, in which said second correlation coefficient is obtained by classifying said roads located within said second limit error and evaluating correlation coefficients corresponding to the classified roads.

12. A location detecting method as set forth in claim 11, in which, in the case that said second limit error consists of a plurality of limit errors which are different in size, while the vehicle travels a predetermined distance, correlation coefficients corresponding to subject roads are evaluated in order of narrower limit error until an estimate location corresponding to a correlation coefficient whose error is less than a predetermined value and smallest.

13. A location detecting method as set forth in claim 12, in which said second correlation coefficient is obtained by evaluating correlation coefficients corresponding to arterial roads.

14. A location detecting method as set forth in claim 12, in which said second correlation coefficient is obtained by considering characteristic of vehicle travel and evaluating correlation coefficients corresponding to roads that the vehicle can travel with high probability.

15. A location detecting method as set forth in claim 1, in which said estimate locations are corrected by the amount of the error between the estimate location to each said road and a location on said road map at a last particular point.

16. A location detecting method as set forth in claim 15, in which in the case that a road of a correlation coefficient to be selected within said first limit error is the only one and that the correlation coefficient is maintained larger than a predetermined value while the vehicle travels a predetermined place of the road, an estimate location corresponding to the one road is corrected by the amount of the error between the estimate location to the corresponding road and a location on said road map at the last particular point.

* * * * *